United States Patent [19]

Reeh et al.

[11] 4,361,336
[45] Nov. 30, 1982

[54] EPOXY-CONCRETE COATED PIPE

[75] Inventors: Kurt Reeh, Wettenberg; Hans-Christoph Jerofke; Friedrich Kramer, both of Wetzlar, all of Fed. Rep. of Germany

[73] Assignee: Buderus Aktiengesellschaft, Wetzlar, Fed. Rep. of Germany

[21] Appl. No.: 193,843

[22] Filed: Oct. 3, 1980

[30] Foreign Application Priority Data

Oct. 4, 1979 [DE] Fed. Rep. of Germany ....... 2940213
Oct. 4, 1979 [DE] Fed. Rep. of Germany ....... 2940214

[51] Int. Cl.$^3$ .............................................. F16L 11/08
[52] U.S. Cl. .............................. 277/207 A; 138/109; 138/143; 138/144; 138/175; 138/155; 138/DIG. 6; 285/31

[58] Field of Search .............. 138/109, 140, 141, 143, 138/144, 175, 155, DIG. 6; 285/31, 149; 277/207 A

[56] References Cited

U.S. PATENT DOCUMENTS

| 474,779 | 5/1892 | Phipps | 138/175 X |
|---|---|---|---|
| 3,955,600 | 5/1976 | Tamburello | 138/175 X |
| 4,114,657 | 9/1978 | Langenfeld | 138/109 |

Primary Examiner—James E. Bryant, III
Attorney, Agent, or Firm—Karl F. Ross

[57] ABSTRACT

A cast-iron or steel pipe is coated with a two-component epoxy resin and then, prior to curing of the resin, is coated with a relatively thick layer of hydraulic concrete. A layer of a water-impervious bitumen is then applied over the concrete. The concrete layer does not extend over the spigot in a bell-and-spigot pipe, and a special fitting is provided for such a piece of pipe when the spigot end must be cut off.

4 Claims, 5 Drawing Figures

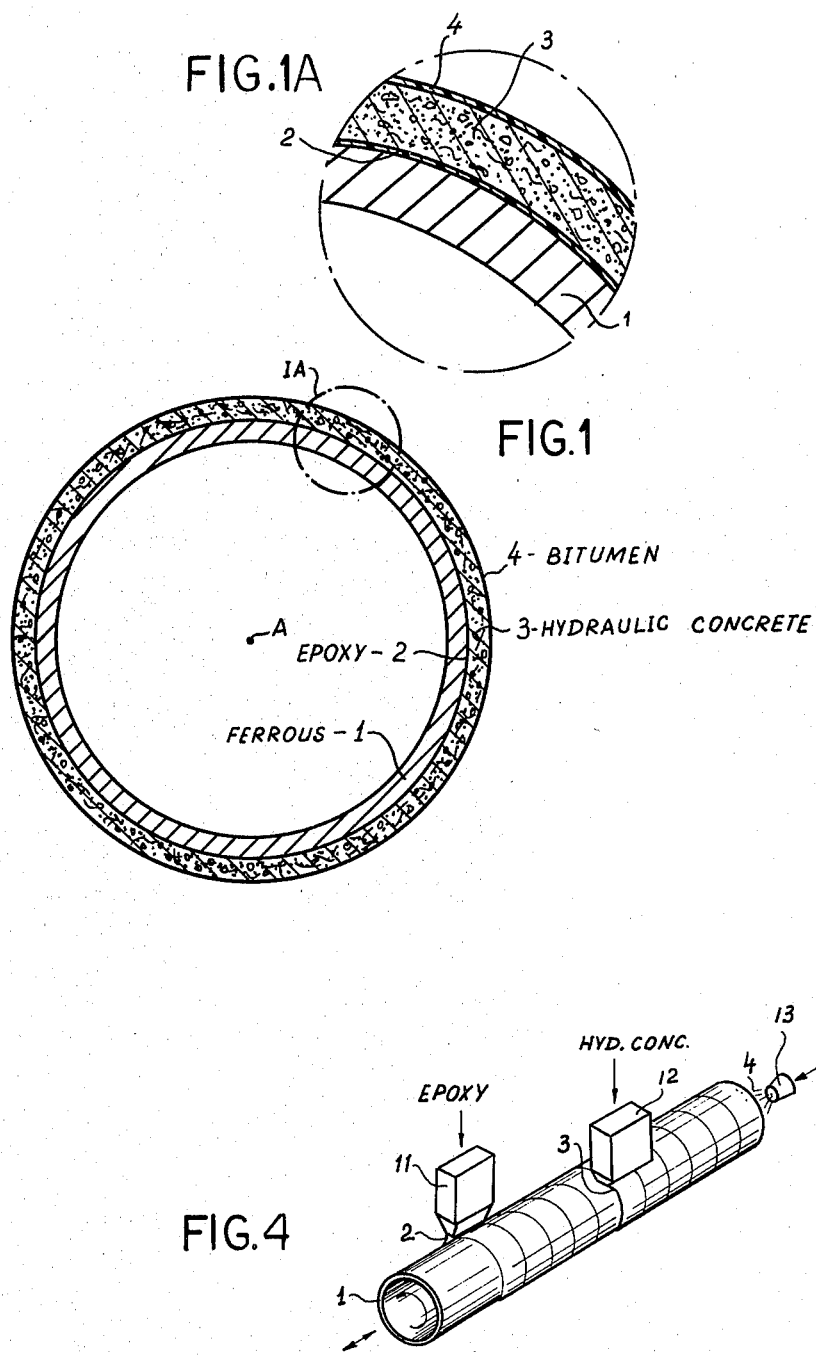

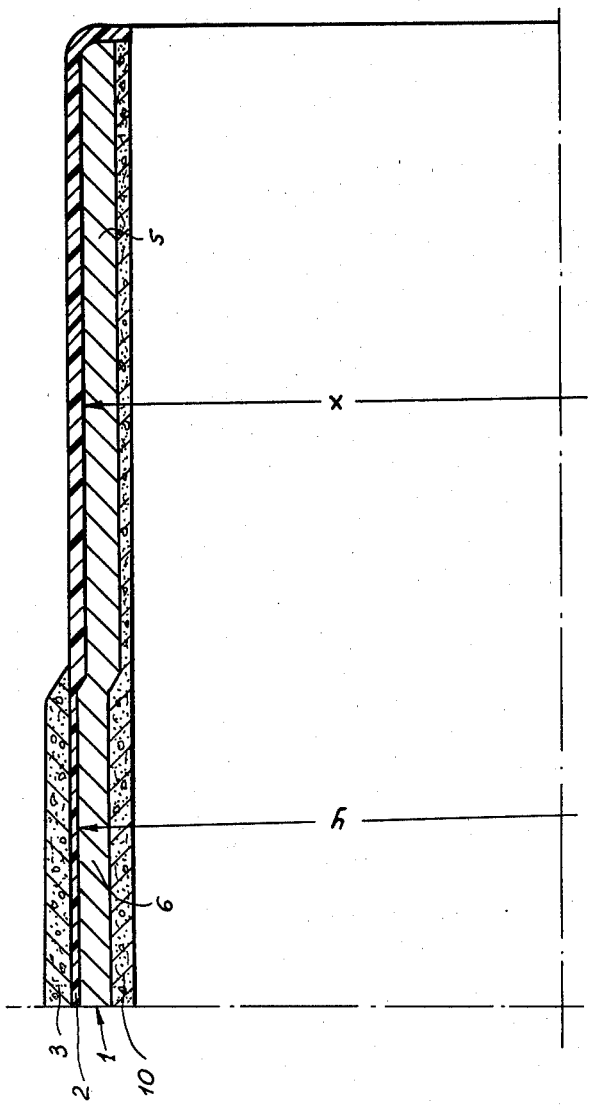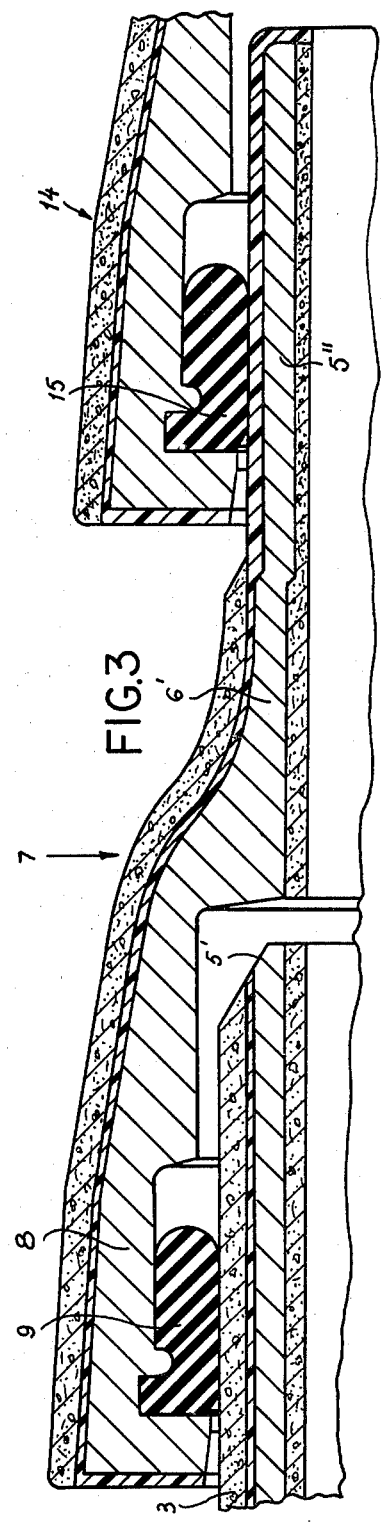

EPOXY-CONCRETE COATED PIPE

FIELD OF THE INVENTION

The present invention relates to a metallic pipe provided with an anticorrosion layer. More particularly this invention concerns such a pipe of the type which is commonly used for sewer and water systems and which is normally buried.

BACKGROUND OF THE INVENTION

In order to protect a cast-iron or steel plate it is well known to be coated with concrete (see German Pat. No. 471,575, British Pat. Nos. 1,309,525 and 1,504,052, French Pat. No. 2,299,135 and U.S. Pat. No. 1,979,656) as well as to line a metallic pipe with concrete (see British Pat. No. 1,462,888, Japanese Pat. No. 36-23,734, and U.S. Pat. No. 3,087,515). In addition it is known to apply a bitumen to a pipe (see German Pat. Nos. 555,130 and 1,278,899 and U.S. Pat. Nos. 1,948,007 and 1,988,628). It is also known to apply a plastic layer on a concrete pipe (see British Pat. No. 1,244,920) and to provide an epoxy layer on a metallic pipe (see U.S. Pat. No. 3,231,443). U.S. Pat. No. 2,158,771 teaches providing an enamel layer directly on a metal pipe and U.S. Pat. No. 4,058,428 teaches the use of a plastic layer on a thick concrete. Finally, it is known from German Pat. No. 2,743,259 to provide a hydraulic concrete layer on a metallic pipe and to cover this with a moisture-impervious layer.

The reason for thus coating or layering a metallic pipe is to protect it against corrosion. In the last of the above-cited patent documents the combination of a moisture-impervious layer and a concrete layer on a pipe ensures that the basicity of the concrete will protect the pipe, while the moisture-impervious layer will preserve the basicity of the concrete. The problem is, of course, when an uncoated portion of the pipe becomes exposed. In this case the entire covered portion of the pipe acts as a cathode and any uncovered portion as an anode so that when an appropriate electrolyte, such as ground water, is present there will be current flow and corresponding deterioration of the anode surfaces. Such deterioration takes place at a substantially greater rate than normal corrosion.

Consequently, it is extremely important to ensure that the anticorrosion layers applied to the pipe form a continuous hole-free layer. This means not only that the layer must be applied perfectly evenly and continuously, but also that it must stand up under the relatively rough handling such pipe is frequently subjected to.

It has therefore been suggested to apply the hydraulic concrete to the pipe with the assistance of a type saturated with the concrete. Such arrangement holds the concrete securely in place while it cures but does not in fact increase the bonding of the concrete to the pipe. Furthermore even if subsequently covered with a moisture-impervious layer, this layer will inevitably be pierced during shipping and installation of the pipe.

OBJECTS OF THE INVENTION

It is therefore an object of the present invention to provide an improved coated metal pipe.

Another object is the provision of such a pipe which will be substantially more rugged than the hitherto known pipes.

SUMMARY OF THE INVENTION

These objects are attained according to the instant invention by applying directly to the outer surface of the pipe a fluent and hardenable mass of a two-component epoxy resin, and immediately thereafter and prior to curing of the resin applying to this pipe over the resin layer a layer of hydraulic concrete which is allowed to cure. The moisture-impervious epoxy layer therefore lies between the metallic, normally cast-iron or steel, pipe and the concrete layer so that it not only is protected against mechanical damage by the concrete layer, but it acts as an excellent bond both with the ferrous pipe and with the concrete layer. Applying the concrete layer over the still soft resin layer ensures the concrete will bond extremely well to this resin layer, and it is well known that epoxy resins bond extremely well to the cast iron or steel pipe that the instant invention is principally aimed at. This not only has all the advantages of a rugged mechanically basic cement layer, but also the advantages of a moisture-impervious epoxy layer, in conjunction with an extremely good bond between these two layers and the pipe they are carried by. The two-component epoxy according to the instant invention bonds very well both to the metal pipe and to the concrete, unlike a simple tar or asphalt layer as has been suggested, for example, by above-cited German Pat. No. 555,130. Furthermore such an arrangement will give a better result than that suggested, for example, in above-cited U.S. Pat. No. 1,979,656 which employs a base layer of grout—a mixture of hydraulic cement and water—over which the concrete layer is applied. An epoxy will harden when wet and is completely compatible with the cement in concrete. Furthermore it sticks extremely well to the ferrous pipe while forming a moisture-impervious layer. Furthermore a two-layer epoxy has great resistance to diffusion and is resistant to most corrosive chemicals.

According to the invention the skin of epoxy is layered directly on the untreated outer surface of the pipe in a layer having a thickness of approximately 100 microns and on top of this the hydraulic-concrete layer, normally including some fibers, is provided with a thickness of 5 mm–10 mm. It is also possible to make this outer layer thicker if necessary. Finally according to the instant invention the outer concrete layer can be covered with a layer of a bitumen such as tar to prevent the concrete layer from losing its basicity.

According to this invention the pipe is of the bell-and-spigot type, such as shown for instance in German Utility Model 7,833,142. Thus one end of each piece of pipe has a flared large-diameter bell and the other a small-diameter spigot. In order to prevent normal corrosion and electrolytic action at the normally exposed metal of the bell and spigot, it is a standard practice to cover these parts with an insulating layer which may, according to the instant invention, be constituted by the inner epoxy layer. According to the present invention the pipe itself is of slightly reduced diameter at its spigot end so that the epoxy layer can be somewhat thicker. Thus the entire surface of the pipe is provided with the inner epoxy layer which has, however, an increased thickness of between 300 microns and 500 microns at the spigot end, made possible by a diameter decrease of approximately 0.5 mm. The epoxy layer also extends over the ends of the pipe according to this invention.

According to another feature of this invention a plurality of lengths of pipe according to this invention may be joined when one of the pipe length must be cut off at its spigot end by a special fitting. The special fitting has at one end a large-diameter capable of fitting over the cut end of the pipe that is cut, since this cut end has a substantially greater diameter as a result of being covered by the concrete layer. The special fitting has at its other end a standard spigot which, as described above, has an extra-thick epoxy layer but no concrete layer. Thus the creation of a particularly easily corroded portion on the pipe is completely avoided.

BRIEF DESCRIPTION OF THE DRAWING

FIG. 1 is a cross section through a pipe according to this invention;

FIG. 1A is a large-scale view of a detail indicated at 1A in FIG. 1;

FIG. 2 is an axial section through the spigot end of the pipe according to this invention;

FIG. 3 is an axial section through the special fitting used according to this invention to join a cut pipe to a bell according to this invention; and FIG. 4 is a largely diagrammatic view illustrating the method according to the instant invention.

SPECIFIC DESCRIPTION

As seen in FIGS. 1 and 1A, a cylindrical bell-and spigot pipe centered on an axis A has a steel core 1 of a diameter of approximately 360 mm and a wall thickness of approximately 20 mm. The untreated outer surface of this core 1 is covered with a layer 2 of a two-component epoxy having a thickness of approximately 100 microns. On top of this epoxy layer 2 is the layer 3 of hydraulic concrete formed on a mixture of water, cement, and aggregates such as very fine sand, and fibers of glass or the like. This layer 3 has a thickness of between 5 mm and 10 mm but may be somewhat thicker. On top of this concrete layer 3 is a thin layer 4 of a bitumen, here tar.

This pipe is made, as shown in FIG. 4, by rotating the core 1 about is axis A while advancing it along the axis A adjacent a nozzle 11 that extrudes a band of epoxy that forms the layer 2 which is upstream in the axial advance direction from a nozzle 12 that forms the concrete layer 3. A further sprayer nozzle 13 is provided for forming the bitumen layer 4, although normally the concrete layer 3 is allowed to cure and harden fully before the bitumen is sprayed on it. Thus the epoxy and concrete are laid on as helical bands, and the concrete is applied well before the epoxy, which can cure while we, hardens or cures.

The pipe according to this invention may be formed as shown in FIGS. 2 and 3 of a cylindrical central section 6 having a spigot 5 at one end and a bell 14 and the opposite end. The outer diameter y of the core 1, and the inner diameter also, are reduced at this spigot 5 by approximately 500 microns so that the thickness of the layer 2 can be increased in this region to between 300 and 500 microns. The epoxy layer 2 covers not only the outer surface of the core 1 but the ends also. The inner surface is covered with a concrete layer 10 in a manner well known in the art, such as suggested in above-cited British Pat. No. 1,244,920, Japanese Pat. No. 36–23,734 and U.S. Pat. Nos. 1,871,508 and 3,087,515. The bell 14 has an inner diameter somewhat larger than the outer diameter of the pipe measured at the outer surface of the layer 2, and is provided with a seal 15 of the type generally described in above-cited German Utility Model No. 7,833,142.

In the event that a piece of pipe according to this invention must be cut, leaving exposed metal at 5' at its end shown in FIG. 2 and eliminating its spigot 5, a fitting such as shown at 7 in FIG. 3 is employed. This fitting is provided at one end with a spigot 5" identical to the spigot 5, with a smooth section 6', and at its other end with a bell 8 provided with a seal 9 roughly equivalent to the bell 14 and seal 15, but of larger internal diameter so that they fit over the outer layer 3. This fitting 7 therefore effectively creates a new spigot 5' for a cut-off piece of pipe which, to this end, is cut off a short distance shorter than would normally be necessary in order to accommodate the fitting 7.

We claim:

1. A pipe comprising:
   a tubular metal pipe core having a central portion, one end formed with a spigot and of smaller outside diameter than said central portion, and another end having a bell;
   a layer of a two-component epoxy resin directly overlying said core at said central portion, said one end, and said other end, said layer being of greater thickness at said spigot than at said central portion; and
   a layer of hydraulic concrete directly overlying said layer of resin at said central portion and said other end only.

2. The pipe defined in claim 1, further comprising a thin coating of a bitumen overlying said layer of concrete.

3. The pipe defined in claim 1 wherein said concrete includes fibers.

4. A pipe assembly comprising:
   a tubular metal pipe core having a central portion, one end formed with a spigot and of smaller outside diameter than said central portion, and another end having a bell;
   a layer of a two-component epoxy resin directly overlying said core at said central portion, said one end, and said other end, said layer being of greater thickness at said spigot than at said central portion;
   a layer of hydraulic concrete directly overlying said layer of resin at said central portion and said other end only and;
   a fitting having
      a spigot substantially identical to said spigot of said pipe and fitted in said bell, and
      at the opposite end a bell similar to said bell of said pipe but having an inside diameter substantially greater than the inside diameter of said pipe and than the outside diameter of the outer surface of said layer of concrete of said central portion of said pipe, whereby if said pipe is cut at its said central portion it can be fitted into the ball of said fitting.

* * * * *